L. S. KALLAJIAN.
COASTER BRAKE.
APPLICATION FILED DEC. 3, 1909.
1,042,006.
Patented Oct. 22, 1912.
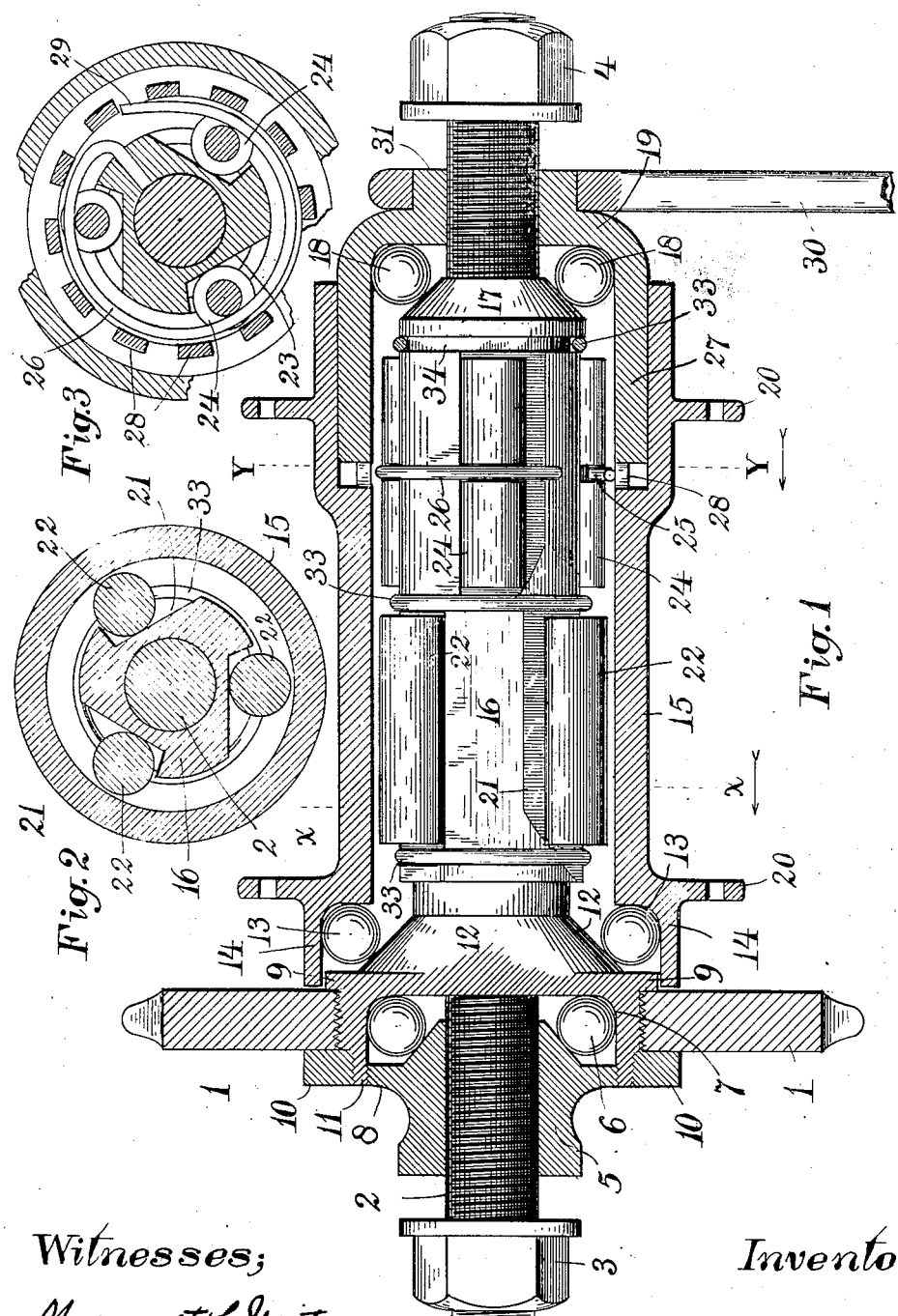
Witnesses;
Inventor,
Lazarus S. Kallajian;
By
Attorney.

UNITED STATES PATENT OFFICE.

LAZARUS S. KALLAJIAN, OF BOSTON, MASSACHUSETTS.

COASTER-BRAKE.

1,042,006.　　　　Specification of Letters Patent.　　Patented Oct. 22, 1912.

Application filed December 3, 1909. Serial No. 531,281.

*To all whom it may concern:*

Be it known that I, LAZARUS S. KALLA-JIAN, a citizen of the United States, residing at the city of Boston, in the county of Suffolk and Commonwealth of Massachusetts, have invented certain new and useful Improvements in Coaster-Brakes, of which the following is a specification.

This invention relates to that class of coaster brakes wherein the clutch mechanism between the sprocket wheel and driving wheel is located within the latter's hub, together with the braking means; and my invention has for its objects the effecting of improvements in details of construction which shall permit of the hub being made much smaller than ever before done, which enables an unbroken spindle to extend from end to end of the hub and turn rigidly with the driving sprocket, causes the clutching and braking actions to be without lost motion, and provides other advantages hereinafter set forth.

Referring to the drawings forming part of this specification, Figure 1 is a longitudinal section of a coaster brake made in accordance with my invention. Fig. 2 is a transverse section of the same on the dotted line X—X in Fig. 1. Fig. 3 is a transverse section on the dotted line Y—Y in Fig. 1.

The reference numeral 1 designates the driving sprocket taking its power through a sprocket chain from the pedal sprocket in the usual way; and 2 is a bolt having nuts 3 and 4 thereon for securing the hub in place between the frame elements. Tapped upon said bolt is a cone 5 pressing the balls 6 into proper contact with the cup 7, said cone being formed with a threaded flange 8 screwing into said cup. Upon the periphery of said cup is screwed the sprocket 1, abutting against the shoulder 9 and secured thereon by the check-nut 10 which engages threads on a slightly reduced portion 11 of said periphery which are opposite to the threads between said periphery and sprocket. At the inner face of said cup is a cone 12 pressing balls 13 into the cup 14 formed at the end of the hub 15, and integral with said cup 7 and cone 12 is the spindle 16 carrying the clutch and brake members, the opposite extremity of said spindle being formed with a cone 17 pressing balls 18 into the cup 19. Externally, said hub 15 is substantially like those in present use, being formed with the cus- tomary flanges 20 from which radiate the wheel spokes to the wheel rim. So long as the clutch devices are inactive, said hub and wheel rotate freely upon the balls and cones 13, 12 and 18, 17. To cause the forcible rotation of the sprocket 1 to turn said hub and its wheel, the spindle 16 is formed with a number of cam grooves 21, preferably three, (see Fig. 2) in each of which is a clutch roller 22. When the spindle is turned in one direction, said rollers simply rotate freely in their grooves against the radial faces of the latter; but the moment the spindle's direction is reversed, said rollers are forced against the surface of the hub 15 and bind the same and the spindle rigidly together.

In the other half of the spindle are similar grooves 23 but opposite in clutching direction, in which are located rollers 24. The latter rollers differ from those previously described simply in having each a deep annular groove at its midlength, in which grooves 25 rests a spring ring 26 normally acting to keep the rollers within their grooves or seats and out of engagement with the surface of the hub. Consequently, when the sprocket and hub are turned for driving the bicycle, these rollers 23 are kept from engagement with the surfaces surrounding the spindle, and also when said parts 1 and 16 are held stationary and the hub and its wheel allowed to rotate freely, as in coasting; but when it is desired to apply a braking action to said hub and wheel, it is necesary to expand said spring ring 26 and so permit the rollers 23 to engage both the inner surface of the hub and at the same time the inner surface of the stationary hood 27 composing a part of said cup 19. This is done by providing the hood 27 with teeth 28 located between the neighboring ends of such hood and the hub 15, and in the same plane with the spring ring 26; and forming said ring with one end pressed into engagement with said teeth, as shown in Fig. 3. The other end of said spring ring being made fast in said spindle 16, as by being bent inward therein, the moment the hub is given a slight backward turn, said engaging end 29 is caught by one of said teeth and said spring ring expanded until the rollers 23 meet the surfaces of both the hub and hood, are forced into clutching engagement with the same, and thereby bind said hub and hood tightly enough together to apply any desired degree of braking action. Said hood is held rigid by means of the lever arm 30, one end of which fits upon a suitably non-circular boss 31 integral with the hood and cup, and the other end of which is fastened to the bicycle frame.

Inasmuch as it is inconvenient, if not practically impossible, to form the clutch-grooves in the spindle accurately co-terminous with the clutch rollers, I retain said rollers in position longitudinally by means of the rings 33 sprung into the annular grooves 34; one of said grooves being shown at the right hand end of the spindle, where said ring is in section.

The view given in Fig. 1 is supposed to be taken from the front of the machine. Although I describe this coaster brake in the preceding specification as applied to a bicycle, it is equally well adapted for use in motorcycles.

The advantage in forming the end of the spindle with a cup 7, and the member 5 with a cone coacting therewith, instead of the reverse, is that thereby a smaller sprocket 1 can be used than would be the case were the cup and cone reversed.

What I claim as my invention and for which I desire Letters Patent is as follows, to wit;—

1. A coaster brake comprising a hub, a stationary hood concentric therewith, a spindle within said hub and hood, clutching means for locking said hub and spindle together when the latter is turned forward, and clutching means for frictionally locking together said hood and spindle when the latter is turned rearward.

2. A coaster brake comprising a hollow hub, a stationary hood concentric therewith and of equal inner diameter, a spindle within said hub and hood, clutching means for locking together said hub and spindle when the latter is turned forward, and clutching means for frictionally locking together said hub, hood and spindle when the latter is turned backward.

3. A coaster brake comprising a hub, a stationary hood concentric therewith and having equal inner diameter, a sprocket and spindle, the latter located within said hub and hood and having clutch grooves longitudinally extended in its periphery, clutch rollers in said grooves with their mid-lengths at the juncture of said hub and hood, and means for holding said rollers away from engagement with said hub and hood, said means being adapted to release said rollers when the spindle is turned backward.

4. A coaster brake comprising a hub, a stationary hood concentric therewith and having equal inner diameter, a sprocket spindle located within said hub and hood having two sets of clutch grooves therein, one set being opposite in direction to the other, clutch rollers located in said grooves, one set of grooves and rollers being located with their mid-lengths at the juncture of said hub and hood, and means normally holding the last named rollers away from engagement with the hub and hood, said means being adapted to release said rollers when the spindle is turned backward.

5. A coaster brake comprising a hub, a stationary hood, both concentric and of equal diameters, a sprocket spindle rotatable within the same and having clutch grooves therein, rollers located in said grooves with their mid-lengths at approximately the juncture of said hub and hood, a spring ring normally holding said rollers away from engagement with said hub and hood, and means acting when the spindle is turned backward to expand said ring and permit said rollers to perform their clutching action between said spindle, hub and hood.

6. A coaster brake comprising a hub, a stationary hood, both concentric and of equal diameters, a sprocket spindle located within the same, and having clutch grooves in its periphery, rollers located in said grooves with their mid-lengths at approximately the juncture of said hub and hood, said hood being formed with teeth at such juncture, and a spring ring normally holding said rollers away from engagement with said hub and hood, one end of said spring being fastened to the spindle and the other adapted to engage said teeth when the spindle is turned backward and to thereby expand said ring.

7. A coaster brake comprising a hub, a stationary hood concentric therewith and of equal inner diameter, a sprocket spindle rotatable within the same and having clutch grooves in its periphery, rollers located in said grooves with their mid-lengths at the juncture of said hub and hood and each formed with an annular groove at its mid-length, and a spring ring having one end fixed in the spindle and the other pressing outwardly, said hood being formed with teeth at said juncture, and said spring lying in said annular grooves with its outer extremity engaging said teeth.

8. A coaster brake comprising a hub, a stationary member, a sprocket spindle rotatable within the latter and extending unbroken through the same, clutching means uniting the hub and spindle when the latter is turned forward, and friction clutching means engaging both said hub and stationary member when the spindle is given a backward turn.

9. A coaster brake comprising a hub having a cup at one end, a spindle having a cone, balls between the same, a sprocket tapped onto the periphery of said cone, a check-nut for the same, a cone having a threaded flange engaging the extended periphery of the first-named cone, the spindle being provided with a cup for the second-named cone, balls for the same, a stationary hood inclosed by the end of the hub opposite to its cup, said hood being formed with a cup, balls therein, the extremity of said spindle being formed into a cone engaging said balls, clutching means locking said hub and spindle when the latter is turned forward, and clutching means frictionally locking together said hood and spindle when said spindle is turned rearward.

In testimony that I claim the foregoing invention, I have hereunto set my hand this 1st day of December, 1909.

LAZARUS S. KALLAJIAN.

Witnesses:
A. B. UPHAM,
HENRY L. WHITTLESEY.